UNITED STATES PATENT OFFICE.

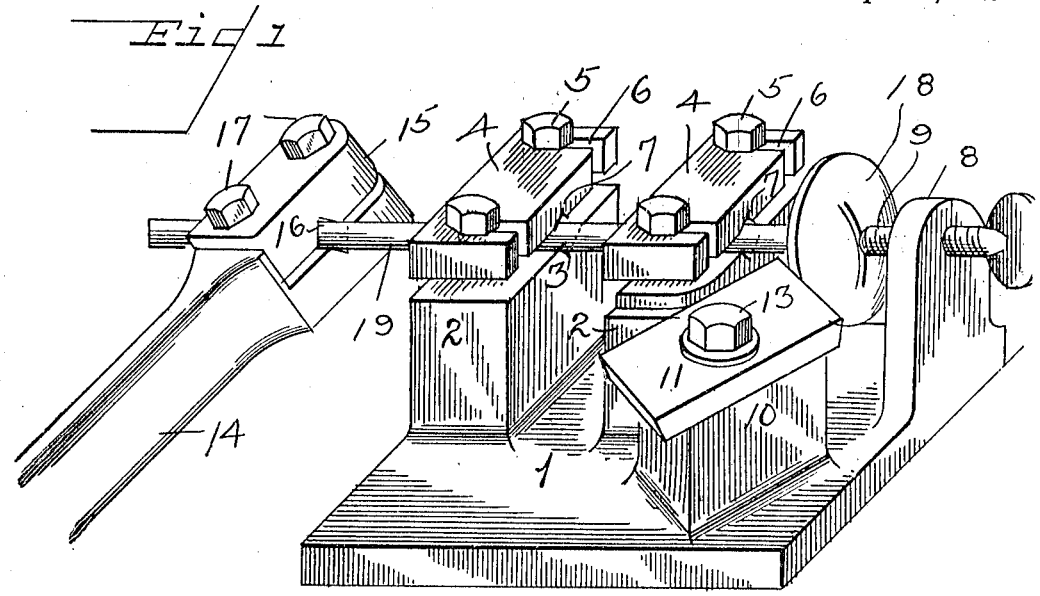
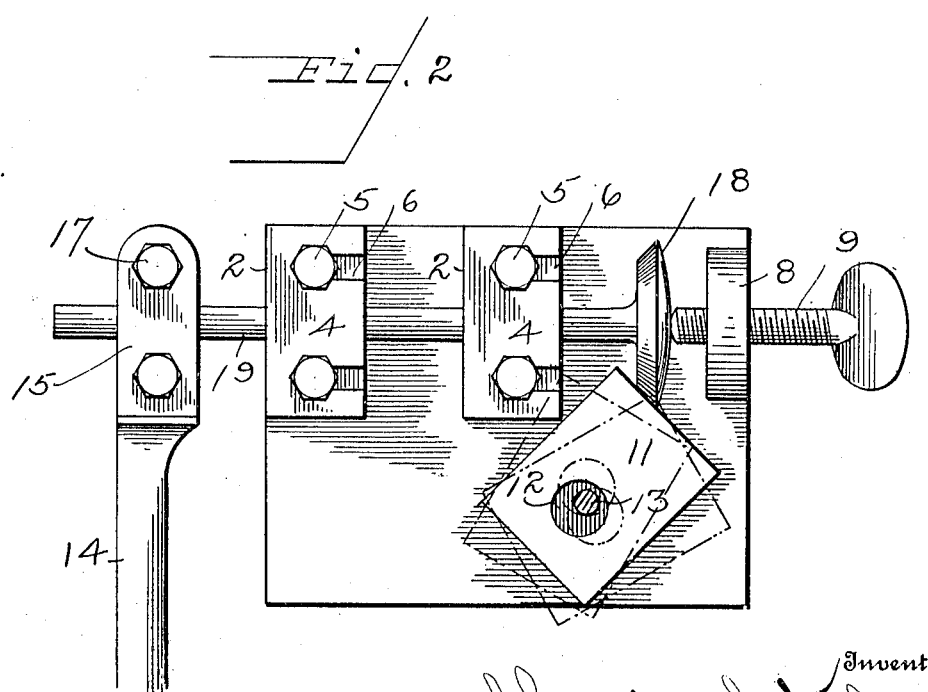

CHRISTOPHER C. KOEHLER, OF CINCINNATI, OHIO.

VALVE-FACING DEVICE.

1,317,195.  Specification of Letters Patent.  Patented Sept. 30, 1919.

Application filed May 2, 1918. Serial No. 232,085.

*To all whom it may concern:*

Be it known that I, CHRISTOPHER C. KOEHLER, citizen of the United States, residing at Cincinnati, in the county of Hamilton and State of Ohio, have invented certain new and useful Improvements in Valve-Facing Devices, of which the following is a specification.

My invention relates to valve truing or resurfacing devices for shaving or refinishing the seating surface of puppet valves such as are commonly used in internal combustion engines.

The object of the invention is to simplify the structure as well as the means and mode of operation of such devices whereby they will not only be cheapened in construction, but will be more efficient in use, positive and accurate in operation, easily and quickly adjusted to accommodate valves of different sizes or valve faces of different angles, easily operated and unlikely to get out of repair.

A further object of the invention is to provide a device which will be substantially automatic in operation thereby enabling valves to be resurfaced or trued by unskilled operators, and further to provide a device which will be small, compact, and easily portable, thereby enabling it to be carried if so desired upon a motor vehicle for emergency use.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Figure 1 is a perspective view of the assembled apparatus with the valve to be operated upon positioned therein. Fig. 2 is a top plan view thereof showing different positions of adjustment of the cutter.

Like parts are indicated by similar characters of reference throughout the several views.

Referring to the drawings, 1 is the base or bed from the top surface of which project upward two spaced pillow blocks or bearings 2—2 having in their upper surfaces notches or V shaped grooves 3 alined one with the other to receive the stem or shank of the valve.

Coöperating with the pillow blocks or bearings 2 are cap plates 4 adjustably held in position by stud bolts 5. The cap plates 4 are slotted as at 6 to enable their disengagement or removal without the necessity of entirely removing the stud bolts 5. The cap plates 4 are provided on their under surfaces with notches or V shaped grooves 7 which register with the notches 3 of the pillow blocks 2 and provide automatic self-centering bearings for the valve stem.

Projecting upward from the base 1 in alined position with the pillow blocks 2—2 is a lug or arm 8 through which extends an adjusting screw 9 positioned in axial alinement with the stem of the valve when the latter is located in the bearings 3 and 7.

There is also located upon the base or bed 1 and preferably integral therewith a pedestal or support 10 for the cutter or surfacing tool 11. The surfacing tool 11 comprises a hard steel plate having one or more edges slightly beveled or undercut for clearance. The cutter 11 is provided with an enlarged opening 12 which engages over a stud bolt 13 located in the pedestal or support 10. The diameter of the opening 12 is much greater than that of the shank of the stud bolt 13 whereby the cutter 11 is capable of not only oscillatory or rotary movement about the stud 13 but is also capable of a lateral shifting movement in relation thereto in any direction whereby the cutting edge of the cutter 11 may be varied not only angularly in relation with the axis of rotation of the valve to accommodate seat faces of different angles but also shifted to and from said axis of rotation to accommodate valves of different diameters. This shifting movement also permits different portions of the cutting edge to be successively presented at the point of operation as the used portion becomes dull.

In Fig. 1 of the drawings the cutter 11 is shown provided with cutting edges at its opposite edge. It is obvious, however, that all four edges of the cutter 11 may be utilized as cutting edges, likewise, the cutter 11 instead of being rectangular might be triangular, thereby affording three cutting edges without changing the operation of the device or the arrangement of the parts.

By locating the enlarged opening 12 of the cutter 11 slightly closer to one cutting edge than to the other, as shown in Fig. 2, the cutter 11 is given a greater range of adjustment. Thus if an extremely small valve is to be trued or resurfaced the cutting edge farther removed from the opening is employed. The cutting edge is thus extended closer to the axis of rotation of the valve. If a larger valve is operated upon the adjacent cutting edge is used. The latitude of adjustment or lateral play permitted by the variation of the size of the opening 12 and that of the stud bolt 13 permits all intermediate adjustments which may be required. Likewise, the cutter 11 may be adjusted to different radial positions about the stud 13 as indicated by dotted lines in Fig. 2, thereby varying the inclination of the valve face.

In order to rotate the valve in relation with the cutter 11 there is provided a crank handle 14 having a clamping head 15, the jaws of which are provided with V shaped grooves or notches 16 to engage the shank of the valve. These jaws are tightened into firm engagement with the shank by means of the adjusting screws 17.

In operation the valve 18 to be trued or surfaced is supported upon the pillow blocks 2—2 with the shank or stem 19 located within the V shaped grooves 3 and the cap plates 4 are located above the stem or shank of the valve with the V shaped grooves 7 engaging thereon. The stud bolts 5 are tightened sufficiently to retain the valve in its bearings but to permit the rotation thereof. The slots 6 of the cap plates enable the plates 4 to be quickly adjusted or removed. The valve is so arranged upon the device that the head 18 of the valve is located intermediate the lug or arm 8 and the adjacent pillow block or bearing 2. The crank arm or handle 14 is securely clamped upon the projecting end of the stem or shank 19 of the valve and the cutter 11 is adjusted to inclined position to agree with the inclination of the seating surface of the valve. When the cutter has been adjusted to agree with the inclination of the valve seating surface and in contact therewith, it is securely clamped in its adjusted position by means of the stud bolt 13. Then by rotating the valve by means of the crank arm 14 and by adjusting the feed screw 9 slightly to carry the head 18 toward the pillow block or bearing 2, thereby moving it into closer relationship with the cutter, a cut of the required depth may be taken.

In practice, it will be found that as the operator becomes expert he can adjust the valve or regulate the depth of the cut by a slight lateral strain upon the crank arm 14 as the valve is being rotated. The depth of the cut and the uniformity of the operation may be determined by the feeling of the operation.

From the above description it will be apparent that there is thus provided a device of the character described possessing the particular features of advantage before enumerated as desirable but which obviously is susceptible of modification in its form, proportion, detail construction or arrangement of parts without departing from the principle involved or sacrificing any of its advantages.

While in order to comply with the statute the invention has been described in language more or less specific as to certain structural features, it is to be understood that the means and construction herein described comprise but one mode of putting the invention into effect and the invention is therefore claimed broadly in any of its possible forms or modifications within the scope of the appended claims.

Having thus described my invention, I claim:

1. In a valve truing device the combination with a support in which the valve operated upon is revolubly mounted, of a plate like cutter having a plurality of cutting edges, an enlarged opening spaced unequal distances from the respective cutting edges, and a clamp stud of materially less diameter than the enlarged opening extending therethrough, whereby the cutter may be adjusted to agree with the angle and size of the valve by shifting it to and fro through various radial and oscillatory adjustments in the plane of such cutter during which movement the enlarged opening assumes various eccentric relations with said stud.

2. In a valve truing device, the combination with a support in which the valve operated upon is revolubly mounted, of a plate like cutter having therein an enlarged opening, and a retaining stud of materially less diameter extending through the enlarged opening whereby the cutter is permitted a limited freedom of movement through various paths of adjustment both radial, eccentric and concentric in relation with said stud.

3. In a valve truing device, the combination with a support, in which the valve to be operated upon is revolubly mounted, of a plate like cutter capable of both reciprocatory and rotary movement in the plane thereof in undetermined directions, whereby the cutter may be adjusted to valves of various angles and sizes, and means for securing the cutter in its adjusted position.

4. In a valve truing device, a base, bearings carried thereby in which the valve to be operated upon is rotatably mounted, means for rotating the valve, a cutter adjustably carried by the base, said cutter having a plurality of cutting edges and also having an opening therein located nearer to one cutting edge than to another, a stud engaging within said opening and limiting the lateral shifting movement of the cutter, the construction being such that by rotating the cutter about said stud different cutting edges may be presented at different distances from the axis of the valve, and by lateral shifting movement within the limits of the opening different intermediate degrees of adjustment of the cutter may be attained.

In testimony whereof, I have hereunto set my hand this 15th day of September, A. D. 1916.

CHRISTOPHER C. KOEHLER.

Witness:
EDWARD E. DUNCAN.

Copies of this patent may be obtained for five cents each, by addressing the "Commissioner of Patents, Washington, D. C."